United States Patent Office 3,493,721
Patented Feb. 3, 1970

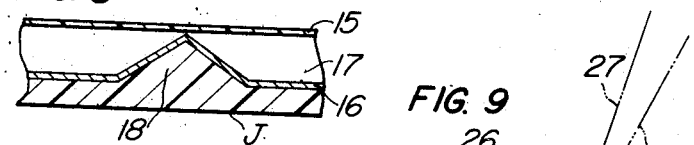
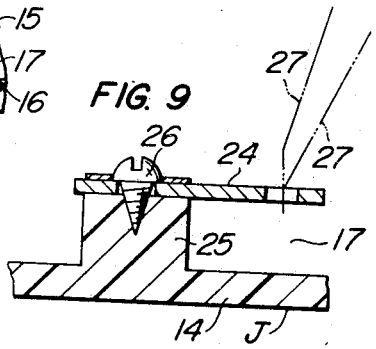
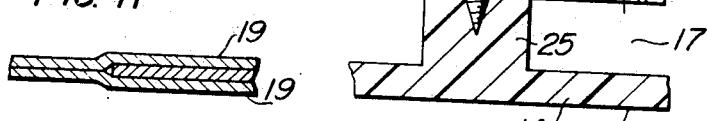
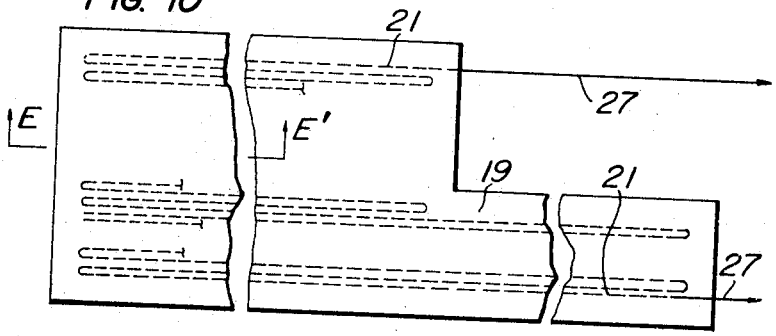
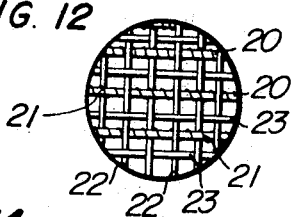
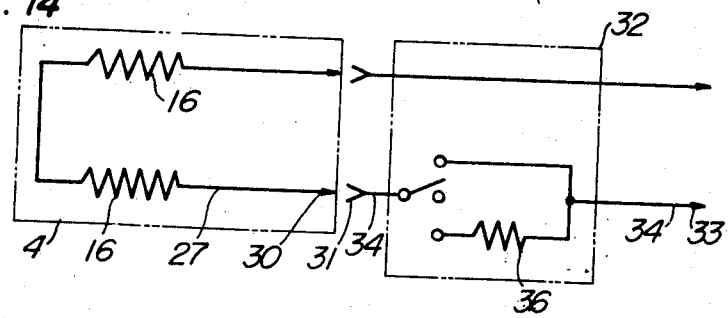

3,493,721
ELECTRICALLY HEATED LAVATORY SEAT
Jiichi Kamitani, Osaka, and Teruo Kawahara, Nara-shi, Japan, assignors to Matsushita Electric Industrial Co., Ltd., Osaka, Japan, a corporation of Japan
Filed Nov. 28, 1967, Ser. No. 686,149
Claims priority, application Japan, Dec. 7, 1966, 41/80,703
Int. Cl. H05b 1/00, 3/58; A47c 7/00
U.S. Cl. 219—217                                    5 Claims

ABSTRACT OF THE DISCLOSURE

An electrically heated lavatory seat having a substantially U-shaped seat body, said seat body being provided with a plurality of radially outwardly tapering ribs on its inner surface, at least one flat heater being attached to said inner surface and adapted to heat said seat body uniformly.

---

This invention relates to a lavatory stool, and more particularly to such a lavatory stool that has a lavatory seat provided with heating means which is effective to increase comfortability of the user sitting on the stool.

The seat of a conventional lavatory stool is generally kept at a room temperature, which is relatively lower than body temperature, especially in winter season, whereby substantial heat is withdrawn from out of the body of the user, thus causing discomfort. The present invention is intended to remove such discomfort by warming the seat up to a suitable temperature in a manner preferable from the point of view of health as well as of mechanical constructions of the stool.

The present invention has a primary object to eliminate any discomfort during use of a lavatory stool by providing heating means in the seat of said stool.

Another object of the present invention is to provide such a lavatory stool that is provided with heating means, including a flat heater whereby temperature on the seat surface may become more uniform than that on the seat of a conventional lavatory stool having a coil heater disposed therein and further temperature rise per unit area of the seat can be decreased over that of a conventional type lavatory stool so that the seat can be produced from a low heat-resistant material.

A further object of the present invention is to prevent wrinkles on a flat heater attached to the inner surface of a U-shaped lavatory seat by providing on said inner surface of the seat one or more ribs tapered radially outwardly, said ribs further contributing to assure close and uniform contact between the inner surface of the seat and the heater, to increase the strength of the seat and to facilitate installation of the heater.

Still further object of the present invention is to provide control means having a selector switch which allows a user to adjust the temperature of the lavatory seat as desired so as to increase confortability during use thereof.

A further object of the present invention is to provide a seat for a lavatory stool which can be readily washed whenever it becomes dirty.

These and other objects and features of the present invention will become apparent in the following descriptions with respect to an embodiment of the present invention taking reference to the accompanying drawings.

FIGURE 8 is a sectional view taken substantially along the line D–D′ of FIGURE 3;

FIGURE 9 is a sectional view taken substantially along the line G–G′ of FIGURE 5;

FIGURE 10 is a plan view of a heater of the present invention for use with the lavatory seat;

FIGURE 11 is a fragmentary sectional view of the heater shown in FIGURE 10 taken substantially along the line E–E′ of FIGURE 10;

FIGURE 12 is an enlarged fragmentary view of a portion of the heater shown in FIGURE 10;

FIGURE 13 is an enlarged fragmentary view of a portion of the heating element used in the heater shown in FIGURE 10; and FIGURE 14 is a circuit diagram of the electric circuit incorporated in the heating means for the lavatory seat of the present invention.

Figure 1:
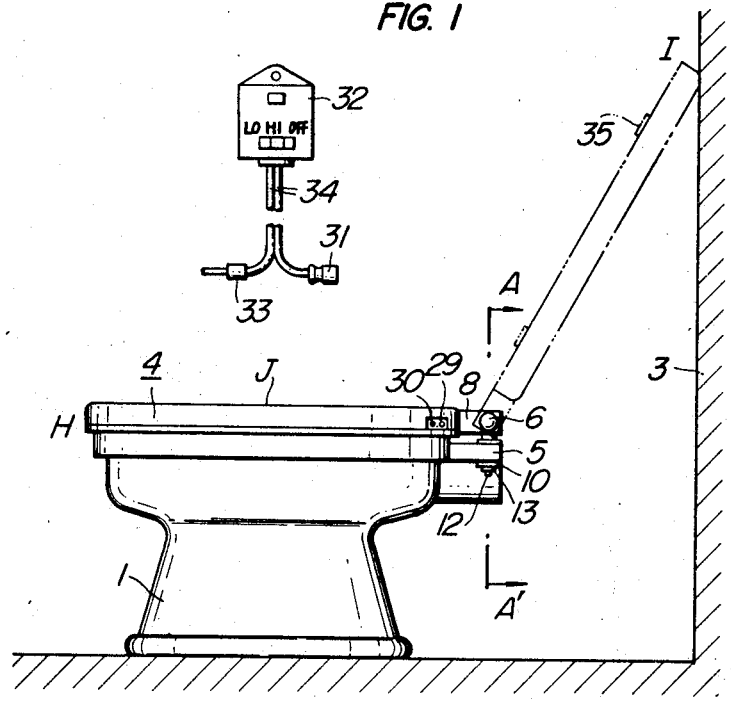
FIGURE 1 is a side elevational view of a lavatory stool having a seat embodying the present invention and a selector switch.

Referring now to the drawings, particularly to FIGURE 1, the numeral 1 shows a lavatory bowl which may be made of a chemical-resistant material such as ceramics and the like and is secured on the floor 2 of the lavatory. On the upper surface of the lavatory bowl 1, there is disposed a lavatory seat 4 which may be conveniently made of a suitable plastic material such as ABS resin. The lavatory seat 4 is pivotally supported at its one end on the bowl 1 and is movable between a using position wherein it is placed on the upper surface of the bowl 1 as shown by full lines in FIGURE 1 and a raised position wherein it is raised from the upper surface of the bowl 1 and rests at its upper end on the vertical wall 3 as shown by broken lines in FIGURE 1.

Figure 2:
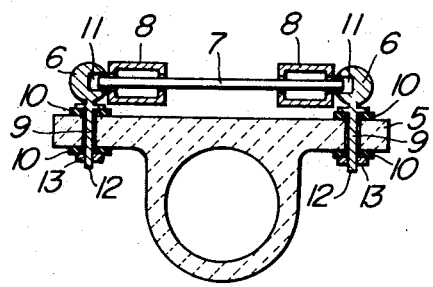
FIGURE 2 is a sectional view taken substantially along the line A–A′ of FIGURE 1.
Figure 3:
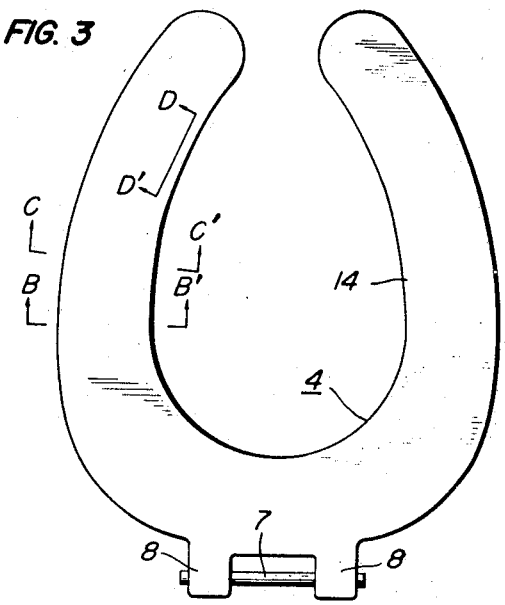
FIGURE 3 is a plan view of a lavatory seat embodying the present invention.
Figure 4:
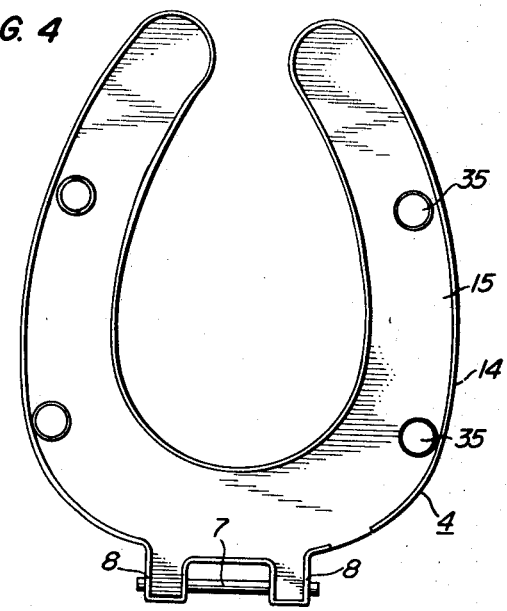
FIGURE 4 is a bottom view of the lavatory seat shown in FIGURE 3.
Figure 5:
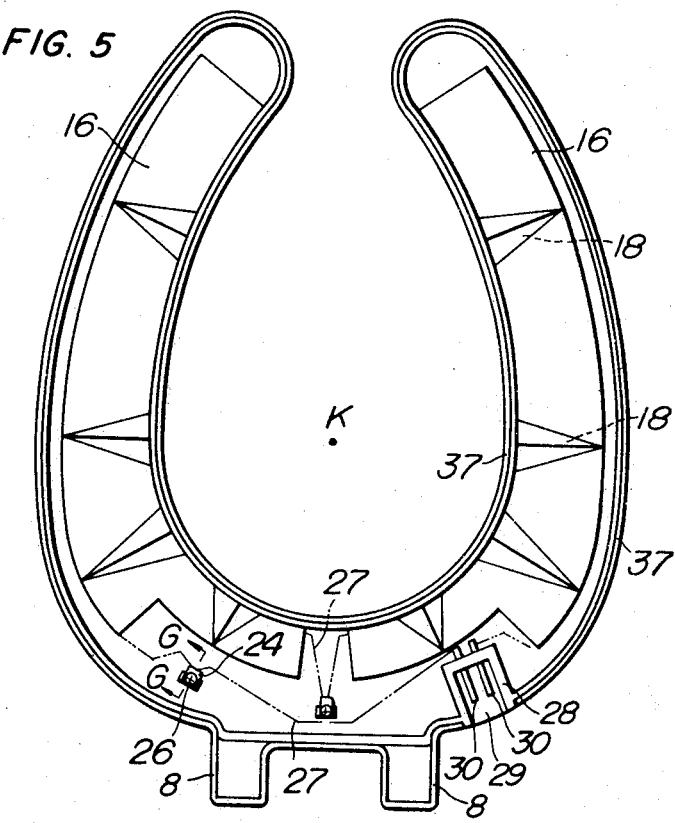
FIGURE 5 is a bottom view of the lavatory seat shown in FIGURES 3 and 4 with the bottom plate removed to show heating means of the present invention attached to the inner surface of the top plate of the seat.

As shown in FIGURES 1 and 2, the lavatory bowl 1 is provided at one end thereof with a fitting portion 5 extending horizontally outwardly therefrom, said fitting portion 5 being formed with a pair of holes 9 located adjacent to the opposite sides thereof. Within each of said holes 9, a fitting 6 is received at its leg portion 12, said fitting being made of a suitable metallic material such as iron or brass and having a head portion formed with a mounting groove 11 opening at one side of said head portion. The pair of said fittings 6 are so inserted into the hole 9 that the mounting grooves 11 of the fittings face with each other, and each of the fittings 6 is secured on the fitting portion 5 by means of a nut 13 threadably engaging with the leg portion 12 of the fitting 6 at the free end thereof. A cushion member 10 which may be made of any suitable yieldable materials such as plastics is interposed between the nut 13 and the fitting portion 5. Between the pair of fittings 6, there is disposed a shaft 7 which may be made of any suitable metallic materials such as iron or brass. The shaft 7 is rotatably received at the opposite ends thereof within the grooves 11 of the fittings 6. The shaft 7 rotatably supports a pair of lug portions 8 extending outwardly from the peripheral portion of the lavatory seat 4. Thus, the seat 4 is movable between said using and raised positions as desired. As shown in FIGURES 3, 4 and 5, the seat 4 is of substantially U-shaped flat construction.

Figure 6:
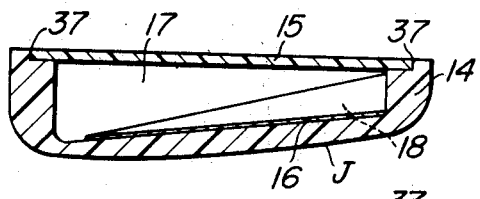
FIGURE 6 is a sectional view taken substantially along the line C–C′ of FIGURE 3.
Figure 7:
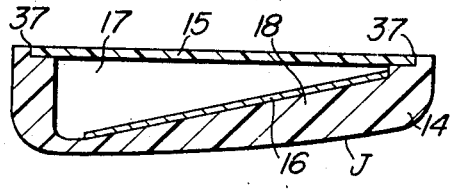
FIGURE 7 is a sectional view taken substantially along the line B–B′ of FIGURE 3.

As shown in FIGURES 6 and 7, the seat 4 is a hollow structure comprising an upper seat plate 14 of downwardly open substantially shallow U-shaped cross-section and a bottom seat plate 15 attached to the upper plate 14 so as to close the bottom opening of the upper plate 14 and form a hollow space 17. The upper plate 14 has an outer surface J on which a human body sits. The bottom plate 15 is attached to the upper plate 14 by providing stepped portions 37 along the bottom surfaces of the upper plate 14, fitting the opposite sides of the bottom plate 15 into the stepped portions 37 and bonding it to the bottom surfaces of the upper plate 14 by using a suitable adhesive. Thus, the hollow space 17 is hermetically sealed so that water is prevented from entering the space 17.

On the inner surface of the upper plate 14 of the seat 4, there are integrally provided a plurality of ribs 18 having trigonal shape tapering toward radially outward direction. These ribs 18 extend radially of the seat and they may not necessarily be of trigonal shape but may have part-conical shape.

Further, a pair of flat elongated rectangular heaters 16 are attached to the inner surface of the seat upper plate 14 by means of a suitable adhesive. The rectangular heater 16 can be attached to the arcuate seat upper plate 14 without creating any wrinkle due to the existence of the trigonal beadings 18 which are disposed in the radial direction of the seat and which are tapering toward radially outward direction.

The heater 16 will now be described in detail with reference to FIGURES 10, 11 12 and 13. As shown in FIGURE 12, the heater 16 comprises a woven fabric having interwoven warp yarns 22 and weft yarns 23 of either natural or synthetic fibers. A length of heating element is repeatingly woven in the fabric in the place of a plurality of weft yarns 23. The heating element comprises, as shown in FIGURE 13, a core thread 20 and a heating wire 21 which may be made of stainless steel, brass or the like material and is coiled around the core thread 20. The woven fabric thus formed is sandwiched by a pair of cover sheets 19 of plastic material such as vinyl sheets, the sheets 19 being sealed together by heat or adhesives at the periphery thereof to form a water-proof heater.

Further, as shown in FIGURES 5 and 9, the seat upper plate 14 is provided with a pair of protuberances 25 on each of which a terminal plate 24 made of brass and the like material is secured by means of a screw 26. Electric wires 27 from the heating wires 21 of the pair of heaters 16 are connected to the terminal plates 24 such as by soldering.

The upper plate 14 of the seat 4 is provided with a partition wall 28 which defines a rectangular recess 29. A pair of terminal pins 30 which may be made of any suitable metallic material are supported by the partition wall 28 with each one end being sealed and projecting into the space 17.

As shown in FIGURES 1 and 14, a pair of connectors 31 which are adapted to cooperate with the terminal pins 30 are connected through a pair of wires 34 to a selector switch 32, the switch 32 in turn being connected through a pair of wires 34 to a plug 33.

It is preferred that the selector switch 32 is installed near the lavatory stool so that the user may conveniently control the temperature of the seat 4 as desired. In FIGURES 1 and 4, the reference numeral 35 shows legs provided on the lower surface of the seat lower plate 15 for resting on the upper surface of the lavatory bowl 1. The legs 35 are made of an elastic material.

The electric control circuit for the electrically heated lavatory seat of the present invention will now be described. As shown in FIGURE 14, a pair of heaters 16 which have been described in connection with FIGURES 10–13 are connected in series and further connected through the lead wires 27, the terminal pins 30, the connectors 31 and the wires 34 with the selector switch 32 which is in turn connected through the wires 34 with the plug 33 for connection with a suitable electric source. The selector switch 32 has an auxiliary resistor 36 which allows the user to selectively control the electric current through the heaters 16 as desired.

In operation of the lavatory stool of the present invention, the user sits on the seat 4. He may close the switch 32 to energize the heaters 16, then the seat 4 is heated by them. Alternatively, the heaters 16 may be continuously energized. In such a case, the seat 4 is always kept in a warm condition and the user can comfortably use the stool whenever he likes. As a further modification, a switch may be disposed between the lavatory bowl 1 and the seat 4 so that the switch is closed to energize the heaters 16 only when the user sits on the seat 4. This arrangement is advantageous from an economical point of view and further simple in operation since it does not require any switch operation.

As described above, according to the heated lavatory seat of the present invention, the seat can be warmed up by a heater or heaters provided therein so that it can be used comfortably even in winter season. The seat of the present invention is also desirable for the health of the user. Further, since the seat of the present invention includes a heater or heaters of a flat shape, it is uniformly heated than in the case of a seat having conventional heater such as a coil-heater. Still further, according to the present invention, temperature rise per unit area can be kept lower than in the conventional seat and the heater elements are distributed in substantially all of the seat inner surface, whereby the seat may be made of a material of lower heat resistance. Thus, the invention makes it possible to select a material for the seat from wide variety of materials and to use a cheaper material.

Further, since the upper plate of the seat is provided on its inner surface with one or more radially extending ribs which are tapering radially outwardly of the seat, even when the seat has an arcuate plan form, the flat heater or heaters can be attached to the inner surface of the seat upper plate without creating any wrinkle. Therefore, according to the present invention, the heater or heaters can be readily and conveniently attached to the seat upper plate. The ribs also serve to reinforce the seat.

Further, according to the present invention, the temperature of the lavatory seat can be adjusted as desired by controlling the energization of the heater through the operation of the selector switch whereby the seat can be used comfortably.

The construction of the seat comprising an upper and a lower plate which are water-tightly sealed together makes it possible to wash the seat without losing the insulation characteristics. Thus, the present invention provides many advantages both in manufacturing and usage.

The portion of the heater which is disposed on the two adjacent side surfaces of the pyramidal ribs gives more heat to the ribbed area than the other part of the seat upper plate. Therefore, although the amount of material to be heated is greater in the ribbed area than in the other part of the seat upper plate, the plate can be uniformly heated.

We claim:
1. An electrically heated lavatory seat comprising a substantially U-shaped body having a concave underside, at least one flexible, flat, rectangular heater in face-to-face contiguous contact with the surface of the underside of said body, and a plurality of outwardly tapering ribs radially extending from said concave underside and in contact with the lower surface of said heater.

2. An electrically heated lavatory seat according to claim 1, wherein said concave underside attached to said heater is closed by a correspondingly U-shaped cover plate adapted to fit the body at the periphery thereof.

3. An electrically heated lavatory seat according to claim 1, wherein said heater comprises a woven fabric having interwoven warp and weft yarns, and including heating elements woven into the fabric, said fabric being sandwiched by a pair of plastic sheets which are sealed together at the peripheries thereof.

4. An electrically heated lavatory seat according to claim 3, wherein said heating elements comprise core threads of non-conductive material with a heating wire coiled around each core thread.

5. An electrically heated lavatory seat according to claim 1, wherein said heater is of reduced area at the rear portion of the U-shaped body.

References Cited

UNITED STATES PATENTS

| | | | |
|---|---|---|---|
| 1,703,005 | 2/1929 | Hewitt | 219—545 X |
| 2,087,112 | 7/1937 | Nishinaka | 219—535 |
| 2,327,756 | 8/1943 | Adamson | 219—545 |
| 2,376,902 | 5/1945 | Clark | 219—217 X |
| 2,798,142 | 7/1957 | Mancin | 219—217 |
| 2,884,509 | 4/1959 | Heath | 219—545 X |

FOREIGN PATENTS 110,261  3/1940  Australia.

JOSEPH V. TRUHE, Primary Examiner

C. L. ALBRITTON, Assistant Examiner

U.S. Cl. X.R.

128—378; 219—535; 297—180